United States Patent Office 3,452,518
Patented July 1, 1969

3,452,518
VAPOUR SEPARATION SYSTEMS
Jan A. Skaug and Einar Kjelland-Fosterud, Skedsmokorset, Norway, assignors to Institutt for Atomenergi, P.O. Kjeller, Norway
Filed June 27, 1966, Ser. No. 560,732
Claims priority, application Norway, June 29, 1965, 158,726
Int. Cl. B01d 19/00
U.S. Cl. 55—204                                    2 Claims The present invention relates to a method and an apparatus for the separation of vapour from a fluid, flowing in a circuit comprising a riser and a downcomer, wherein the vapour is separated from the fluid both by natural separation at the top of the riser and by forced separation at the inlet to the downcomer.

In particular, the invention relates to a method and an apparatus for the separation of vapor from a cooling and/or moderator fluid which circulates through a riser and a downcomer in a nuclear reactor, wherein the fluid, when flowing from the riser to the downcomer is caused to enter a number of cyclone separators forming the inlet to the downcomer, and the forcibly separated vapour is fed through tubes from the cyclone separators to a vapour space in the reactor tank, while separated fluid is fed to the downcomer, the fluid being permitted to flow freely in the riser and to give off vapour to the vapour space by natural separation, before being forced into the cyclone separators.

In the separation of vapour from circulating fluids, it is a common practice to subject the fluid merely to natural separation, possibly followed by a forced separation, or to subject the fluid merely to forced separation in one or a number of succeeding stages. In both cases, all the fluid is subjected to one or the other type of separation. In the case when only forced separation is applied, the separation system must be of a comparatively great capacity and it is to be expected that a relatively great loss in pressure will occur in the circuit, due to the provision of the separators.

Thus, the method of the invention deviates from the previously known separation methods referred to above, in that only part of the fluid is subjected to natural separation, while the remainder is subjected to forced separation in such a manner that the forced and the natural separations in combination are more effective than any of the separation methods would have been per se, and so that the resulting loss in pressure is less than in the case of either natural or forced separation when applied alone.

In a liquid circuit with natural vapour separation, a great proportion of unseparated vapour will be entrained by the liquid in the downcomer. Depending upon the temperature and circulation conditions, part of such vapour will be entrained by the liquid in the flow of the same through the circuit, while the greater proportion of the vapour will remain in the downcomer and restrain the liquid circulation.

A purpose of the present invention is to prevent such entraining of vapour, and this is achieved by the vapour, which would otherwise be entrained into the downcomer being separated from the circulating liquid by forced separation at the inlet to the downcomer.

An obvious consequence of this is that the vapour separation is increased but, surprisingly, such increase appears to be disproportionately greater than what would be expected from the forced separation per se. This is due to the fact that the natural separation per se, also becomes more effective than if no forced separation is effected in the inlet to the downcomer. Equally surprising, it is found that the forced vapour separation becomes more effective than when there is no natural separation prior to reaching the inlet. This favourable cooperation between natural and forced vapour separations from a flowing fluid, is the characteristic of the present invention, and may be explained by the fact that the part of the total bubble spectrum present in the riser of the circuit, which comprises the comparatively small bubbles is entrained out of the riser, according to the method of the invention, and separated from the liquid at the inlet to the downcomer by forced separation. The result is a decreased bubbling and a more efficient natural separation of the comparatively big bubbles at the top of the riser of the circuit at the same time the natural separation of such big bubbles makes the forced separation more efficient.

The apparatus according to the invention is essentially characterised in that the same comprises a system of essentially vertical, immediately adjoining cyclone separators at the inlet of the fluid to the downcomer of the circuit, means at the top of the system sealing the spaces between the separators, tubes connecting the central portion of each separator to a vapour space above the fluid and a partition positioned between the riser and the downcomer of the circuit and closely adjoining the lower part of the system.

Consequently, when a liquid-vapour mixture is flowing in the riser of the circuit through natural or intensified natural circulation, the liquid is confined to one path only at the top of the riser, viz through the separators. The vapour bubbles, on the other hand, may either move upwardly and be separated from the liquid by natural separation, or entrained with the liquid in the separators and separated from the same by forced separation and fed to the vapour space above the liquid through the tubes of the separators.

The cyclone separators may be of the conventional tubular type, provided with an inlet in the top part for tangential introduction of vapour and liquid, and a liquid outlet at the bottom and a central top outlet for vapour which is separated out. According to the invention, the inlet of each separaor is horizontally defined by the adjacent wall of an adjoining separator and an essentially plane plate, positioned oppositely to the wall and extending vertically at a distance from the wall and in parallel configuration to the flow direction of the fluid from the wall of the separator in the region extending from the riser to the center portion of the separator. Vertically the inlet is defined by the top of the separator system and the top of the partition, which are spaced relatively to each other.

According to one feature of the apparatus of the invention, each separator may advantageously be arranged in a slanting position, with the top end pointing against the flow direction of the fluid from the riser to the downcomer. By way of example, the separators may be arranged at an angle of 10° to the vertical, dependent i.e. of the flow section of the separators and the flow conditions.

According to a further feature of the apparatus of the invention, the separators may be adapted to be turned in a plane extending parallel to the flow direction of the fluid from the riser to the downcomer. In such manner, a more efficient separation is obtained at varying liquid circulation.

The method of the invention is applicable to one or two component separation of vapour or gas from liquid, the term vapour being here used as including either vapour or gas.

The apparatus of the invention may be used both in boilers and in various apparatus for use in the chemical industry.

As a particular example of utilization, reference will be made to the separation of vapour from a coolant and/or moderator fluid circulating in the tank of a nuclear reactor. In that case, the apparatus of the invention is modified and adapted to the particular conditions reigning in a nuclear reactor tank. In a preferred embodiment, the apparatus comprises a system of essentially vertical cyclone separators arranged in parallel rows in the fluid flow at the inlet to the downcomer of the circuit and having the rows mounted in stepwise higher positions from the riser of the circuit to the wall of the reactor tank. Further, the apparatus comprises means at each such step for the sealing of the spaces between the separators, tubes connecting the central portion of each separator to the vapour space of the reactor tank, and a partition extending between the riser and the downcomer all around the core.

A test plant including the apparatus of the invention has proved that the present method reduces the amount of vapour entrained in the downcomer of a reactor tank to an insignificant minimum and prevents vapour from accompanying the liquid into the reactor core. This involves the advantage that the circulating velocity of the liquid in the tank is increased, as no vapour in the downcomer is counteracting the upward movement in the riser, whereby a stabilizing effect is obtained on the reactor operation. A further consequence is that the dimensions of the reactor tank may be kept low, a fact which is of particularly great interest in connection with marine reactor plants. Of other advantages, reference may be made to the fact that control means and fuel elements may be freely introduced into and removed from the core, unobstructed by the separator system. Further, the apparatus of the invention is very simple and cheap in construction.

The invention is now to be more closely described, with reference to the accompanying drawings, in which.

Figure 1:
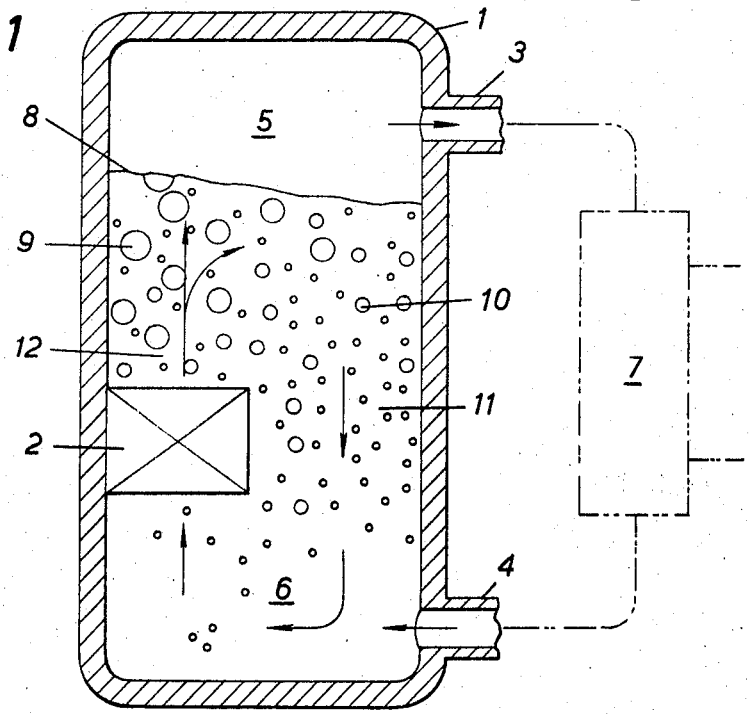
FIGURE 1 is a vertical sectional view of a tank, with natural vapour separation in a circuit including a heat source.

In the drawings, 1 is a tank provided with a heat source 2, an outlet 3 and an inlet 4 connecting the vapour space 5 and the liquid space 6, respectively of the tank to a heat exchange system 7. A liquid in the space 6 will, when heated to boiling by the source 2, circulate naturally as indicated by the arrows in the figures.

Vapour generated by such boiling is separated from the liquid into the space 5 above the liquid surface 8, essentially by transfer of vapour bubbles 9 of a certain diameter, while some of the vapour bubbles 10 of smaller diameter are entrained with the circulating liquid in the natural circuit into the downcomer portion 11 of the circuit. According to the circulation conditions and the vapour generation, some vapour will accompany the circulating liquid all around the circuit, while a smaller or greater amount of vapour will remain in the downcomer 11 thereby counteracting the raising effect of the vapour bubbles in the riser portion 12 of the circuit.

Figure 2:
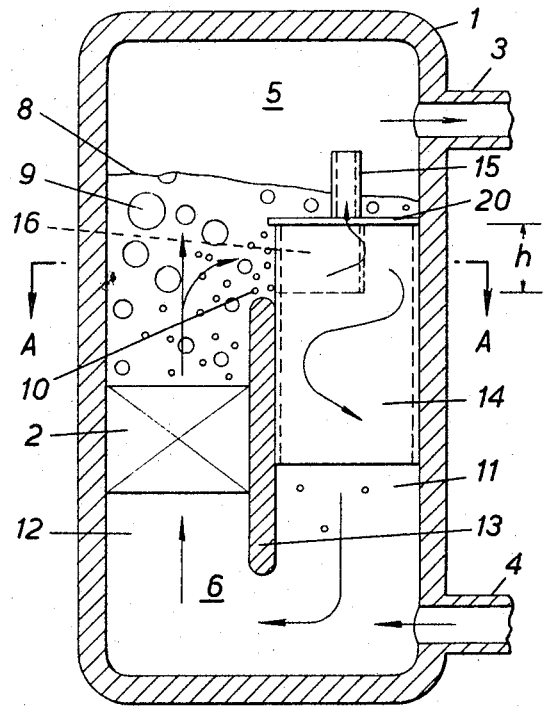
FIGURE 2 is a similar vertical sectional view, including a system according to the invention.
Figure 3:
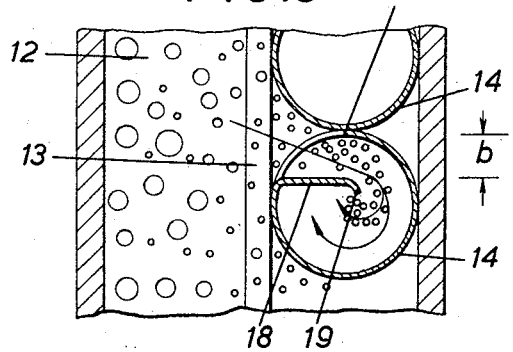
FIGURE 3 is a horizontal sectional view, taken along the line A—A in FIG. 2.

As shown in FIGS. 2 and 3, there is provided a partition 13 between the riser 12 and the downcomer 11, and in the top portion of the downcomer and above the partition 13, there is provided a cyclone separator 14. Instead of one separator, as shown, a number of such separators may be provided. Each separator is submerged in the liquid 6 and the central part of the same is communicating with the vapour space 5 above the liquid surface 8 through a tube 15.

The inlet 16 to the separator 14 is of rectangular shape, having a height $h$ and a width $b$ and positioned just above the inlet to the downcomer 11, i.e. above the top of the partition 13. When the liquid-vapour mixture is entering the separator inlet 16, it is, in a manner known per se, forced to follow the spirally wound separator tube walls and is subjected to a field of centrifugal forces directed from the central axis of the tube radially outwardly towards the circumference. Thereby, the liquid is forced radially outwardly, leaving the vapour bubbles along the center line of the tube. In addition to the centrifugal force, the mixture is subjected to gravity, to the effect that the vapour bubbles ascend through the tube 15 into the vapour space, while the liquid descends through the downcomer 11.

The circulation of the liquid may be natural, i.e. caused by the heating in the heat source 2, or this natural circulation may be stimulated by any additional means. The separators may be positioned so as to adjoin each other, as shown in FIG. 3, and the inlet 16 of each separator 14 conveniently may be defined by the wall 17 of the neighbouring separator and a sheet 18 extending from the partition 13 towards the central part of the separator 14 and terminating in a curved portion 19. The top of the separators is closed by a plate 20, FIG. 2, so that all the circulating liquid is compelled to enter the separator inlets 16.

The diameter of the separator tubes depends on the type of liquid to be subjected to the vapour separation and on the pressure, temperature and circulation velocity. The flow section of the inlet and the number of separator tubes depend on the volumetric ratio of vapour to liquid and on the circulation velocity.

Figure 4:
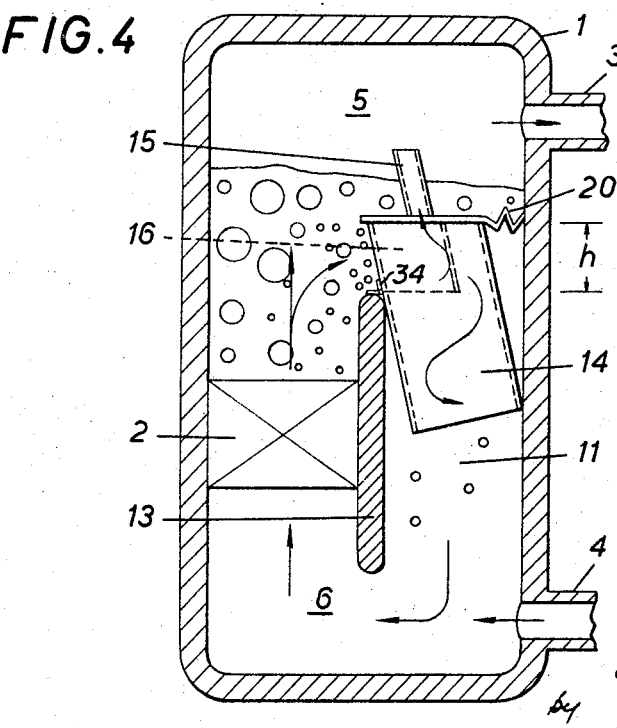
FIGURE 4 is a vertical sectional view, similar to that of FIG. 2, illustrating a further embodiment of the system according to the invention.

As shown in FIG. 4, the separators may be arranged in a slanting position. The angle depends on the radius of the separator tubes and on the conditions prevailing in the circuit. Thus, if the circulation is modified, it may be convenient to use separators which are adapted to be turned about a horizontal axis by means of a hinge 34, so that the angle of slanting may be changed according to the circulation conditions. The top of the separator is closed by a plate 20 which extends through a flexible portion to the internal surface of wall 1 so that all circulating liquid enters the separator inlets 16 irrespective of the angle of the separators.

Figure 5:
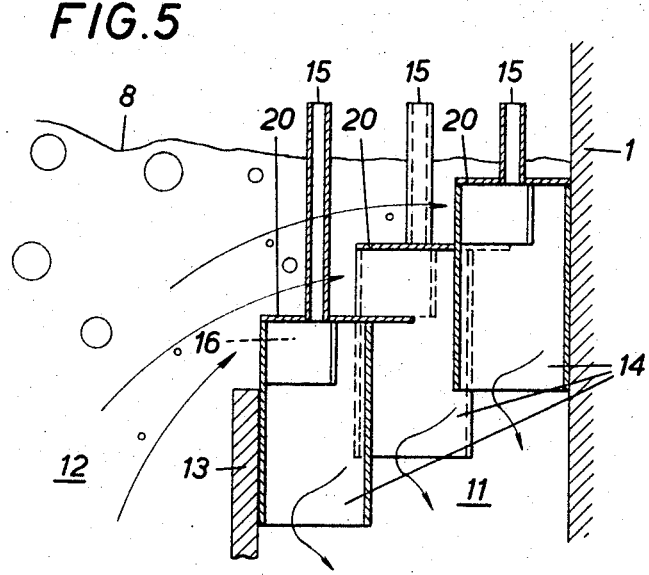
FIGURE 5 is a vertical fractional sectional view, illustrating the principle of a further embodiment of the separator system.
Figure 6:
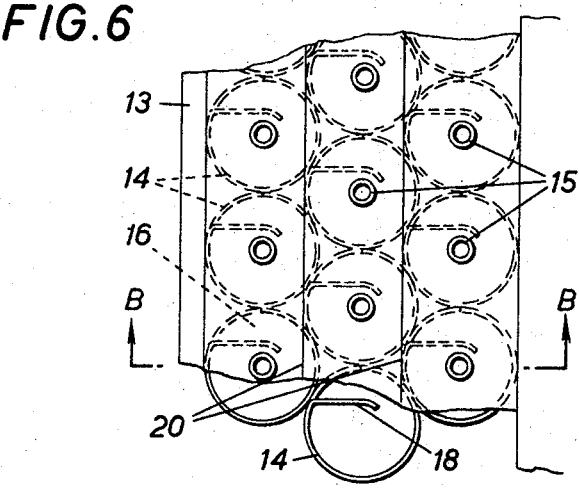
FIGURE 6 is a fractional plan view corresponding to FIG. 5.

If the required flow section of the separator inlets 16 entails a height which is so great that the operation of the separators is depreciated, such depreciation may be reduced by the mounting of several parallel rows of separators, one behind the other in the flow direction of the liquid and so that the separators of each row are mounted one step higher than those of the preceding row. Such an arrangement is shown in FIGS. 5 and 6. The plate 20 closing the top of the separators of each row, is extended towards the separator tubes of the following row and adapted to the shape of the same, such that the spaces between the separators are closed, so as to prevent fluid from flowing past the separators 14 into the downcomer 11 without being subjected to forced separation.

Figure 7:
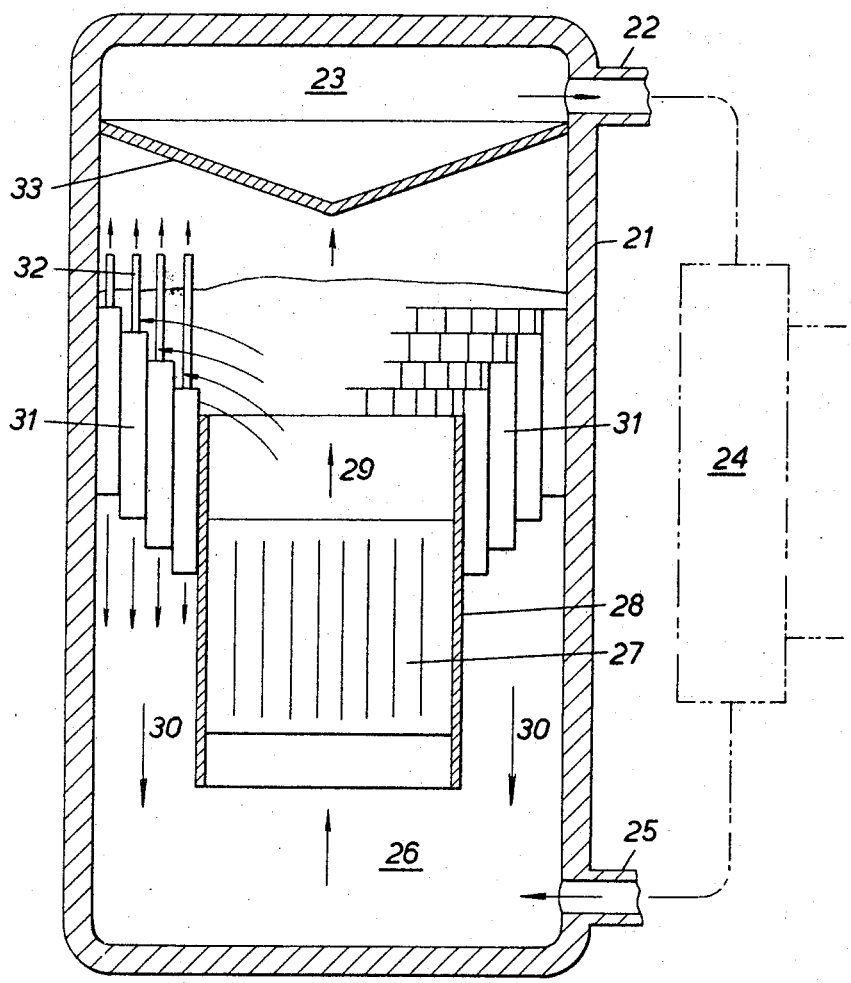
FIGURE 7 is a vertical sectional view of a separator system according to the invention, applied to a nuclear reactor.

In FIG. 7, 21 is a nuclear reactor tank, provided with outlet 22 from the vapour space 23 to a heat exchange device 24 and return condensate inlet 25 to the liquid space 26 in the tank. The reactor core 27 is surrounded by a wall 28 separating the riser 29 of the tank from the downcomer 30 of the same. Around the top portion of the wall 28 and above the same, there is provided a number of separators 31 arranged in circular, parallel rows as principally shown in FIGS. 5 and 6, but structurally the separators may be of any convenient construction. Each separator 31 is provided with a central tube 32 extending into the vapour space 23. For the purpose of making the drawing clear, only a small number of separators are shown. In the vapour space 23, there is also provided a conventional secondary vapour separator 33 for a final vapour separation, prior to the feeding of the vapour through the outlet 22 to the heat consumer 24.

During operation of the reactor, the coolant/moderator liquid will, due to boiling, circulate through the core 27, upwardly through the riser 29, turn over the top of the wall 28 all around the circumference of the same and flow back to the core through the separators 31 and the downcomer 30. The vapour generated in the core is separated from the liquid, partly through natural separation and partly through the forced separation effected in the separators.

We claim:

1. In apparatus for the separation of vapor from a fluid comprising a liquid vapor mixture which is circulating in a closed circuitous path in the apparatus comprising a tank, a riser and a downcomer mounted in said tank, a vapor space above the outlet of said riser and the inlet of said downcomer, and a partition between said riser and said downcomer, the improvement comprising a plurality of substantially vertically disposed individual centrifugal separators having a vapor outlet to said vapor space and a fluid outlet to said downcomer, the inlet of each of said separators being horizontally defined by the adjoining wall of an adjacently situated separator and an essentially plane vertical plate extending in spaced relationship to said adjoining separator wall from the separator wall in a direction towards the riser, the inlet of each separator being vertically defined by the top of each separator and the top of said partition arranged between the riser and the downcomer.

2. Apparatus for separating entrained vapor in a fluid comprising a vapor-liquid mixture, said apparatus comprising a tank having a generally vertically disposed wall and including a fluid circulation circuit having a central riser and an annular downcomer surrounding the riser, said riser and said downcomer being separated by a partition, a vapor space above the predetermined surface level of said fluid, a plurality of substantially vertical cyclone separators being mounted in concentric rows at the inlet to the downcomer, the separators of each row being vertically displaced relative to the separators of an adjacent row to form a step-by-step rising arrangement from the partition between the riser and the downcomer towards the tank wall above the inlet to the downcomer, a plate being mounted at the top of each separator row sealing spaces between the individual separators, each of said separators being provided with a tube extending from the central part of the separator to said vapor space in the tank, whereby vapor separated from said fluid in said separators may be conveyed to said vapor space.

References Cited
UNITED STATES PATENTS

| | | | |
|---|---|---|---|
| 2,439,850 | 4/1948 | Heller | 55—348 |
| 2,632,527 | 3/1953 | McBride et al. | 55—344 |
| 2,845,906 | 8/1958 | Gram | 122—32 |
| 2,904,130 | 9/1959 | Chapler | 55—344 |
| 3,057,333 | 10/1962 | Kuhner | 55—349 X |
| 3,074,219 | 1/1963 | Phyl et al. | 55—348 |
| 3,247,650 | 4/1966 | Kornbichler | 55—342 X |

REUBEN FRIEDMAN, *Primary Examiner.*

R. W. BURKS, *Assistant Examiner.*

U.S. Cl. X.R.

55—349